UNITED STATES PATENT OFFICE.

WESLEY A. WRIGHT, OF LYNCHBURG, VIRGINIA, ASSIGNOR TO LEWIS LEE ARMISTEAD.

IMPROVEMENT IN TREATING SMOKING-TOBACCO.

Specification forming part of Letters Patent No. 111,712, dated February 7, 1871; reissue No. 4,962, dated July 2, 1872.

SPECIFICATION.

*To all whom it may concern:*

Be it known that I, WESLEY A. WRIGHT, of Lynchburg, Campbell County, State of Virginia, have invented a new and Improved Method of Treating Smoking-Tobacco, of which the following is a full, clear, and exact description:

The object of my invention is to utilize and render valuable the material about tobacco factories which has heretofore been worked up into smoking-tobacco of a grade not to be remunerative in market, and, at the same time I give the tobacco a delicious flavor, which will commend it to popular favor. By my treatment of this material I produce a superior article known as "Durham Smoking-Tobacco."

To enable others skilled in the art to make and use my invention, I will proceed to explain the manner in which I have carried it out. I take four pounds of tonka-beans, four ounces of mace, two ounces of vanilla-beans, and two pounds of angelica, (dried,) and grind all to powder. I then put into it one gallon of alcohol, and allow the mixture to stand four or five days. I then empty it into a barrel of New England rum, say from thirty-five to forty gallons, and let the whole stand for one week, but shaking the barrel well every day. The mixture is then ready for use. When the tobacco is prepared for packing I make a tea, moderately strong, from the bark of sassafras root, and strain it well. To six gallons of this tea I add one quart of the above mixture, and with this composition moisten the tobacco and stir it well. Then take one pound of tonka-beans, ground fine, and sprinkle on the tobacco, say about three hundred pounds, and again stir it well. Let it lay over one night, covered with a cloth or matting. Then pack in bags or boxes, and place in a dry room until the tobacco is thoroughly dry, when it is ready for market.

One of the great advantages of this process of treating tobacco over any other is, that the essential oils and alcohol I use counteract, in a great measure, the effects of the nicotine of the tobacco on the nervous system; and thus delicate persons are enabled to smoke with impunity.

By the use of the dry tonka-bean, ground fine and sprinkled through the smoking-tobacco while in course of preparation, I am enabled to secure a delightful flavor which cannot be secured by any other known means, and which adds much to the value and popularity of the tobacco.

*Claims.*

Having thus described my invention, what I claim as new, and desire to secure by Letters Patent, is—

1. The above-described process of treating smoking-tobacco, substantially as and for the purpose set forth.

2. The use of the dry pulverized or ground tonka-bean, in the preparation of smoking-tobacco, substantially as and for the purpose set forth.

3. As a new article of manufacture, smoking-tobacco, when treated substantially as above described.

W. A. WRIGHT.

Witnesses:
W. S. ODELL,
H. C. VICTOR.